March 22, 1966  ARATA KIMURA ET AL  3,242,345
LIGHTWEIGHT ELECTRICAL GENERATOR SET EMPLOYING A MERCURY
POWER CYCLE AND NITROGEN COVER GAS
Filed Nov. 9, 1961  6 Sheets-Sheet 1
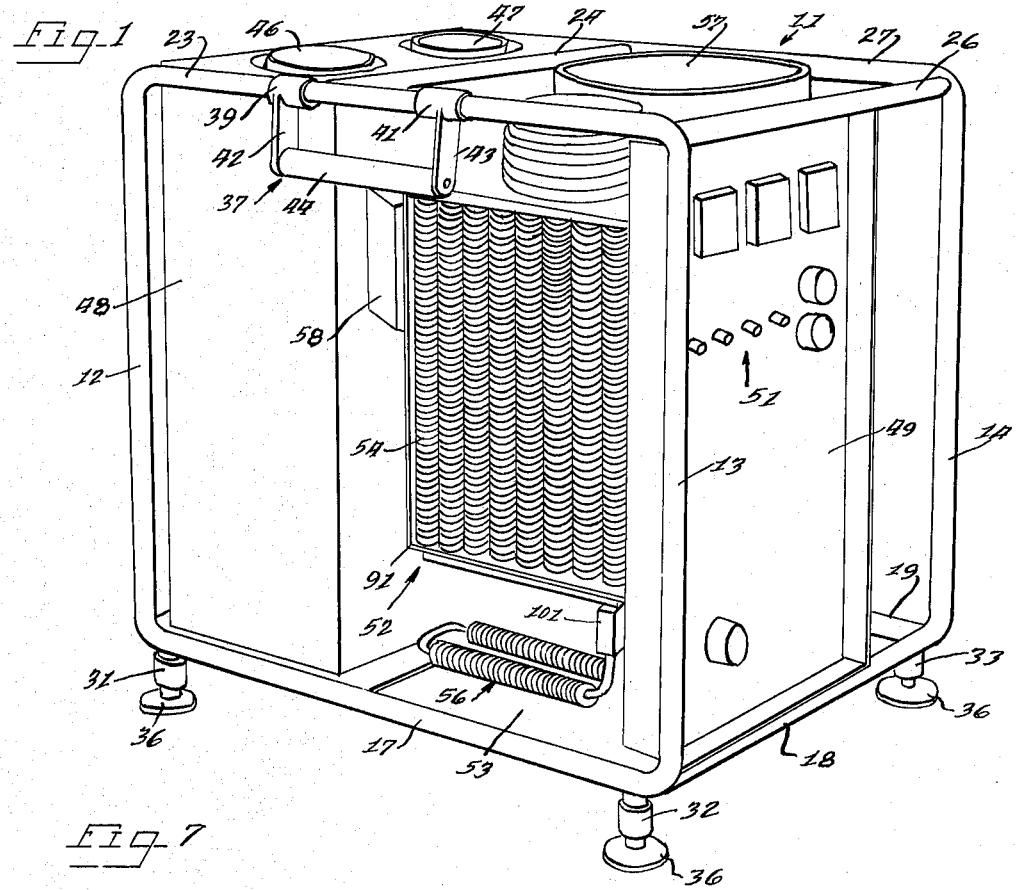
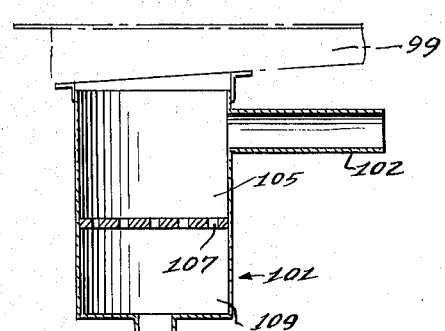
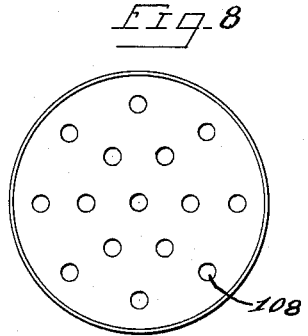
INVENTORS
Arata Kimura
BY Richard P. Nemetz
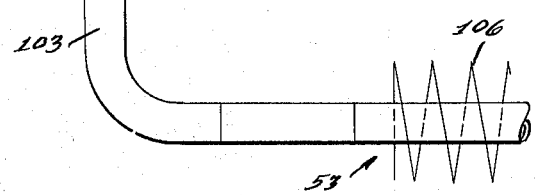
ATTORNEYS

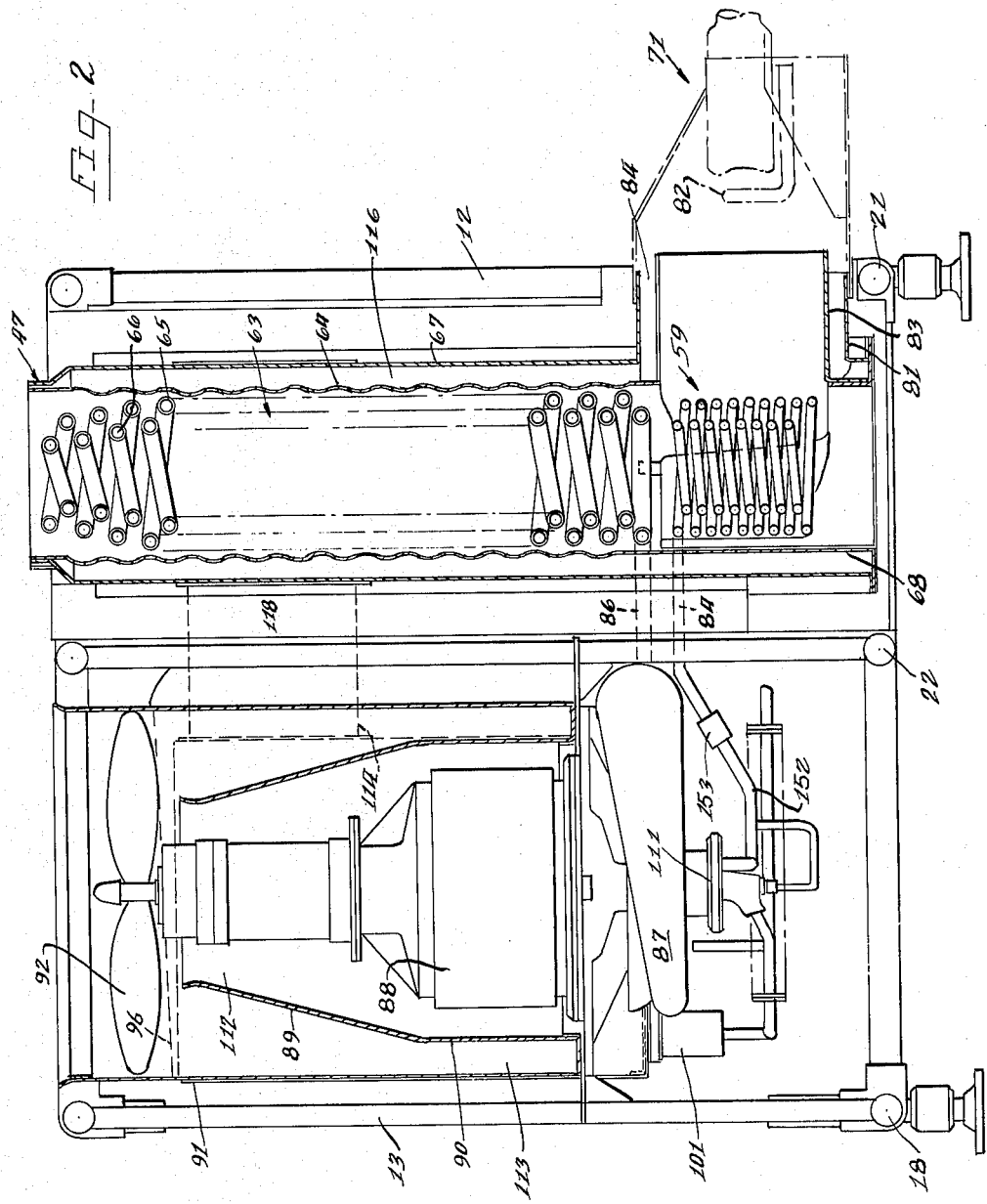

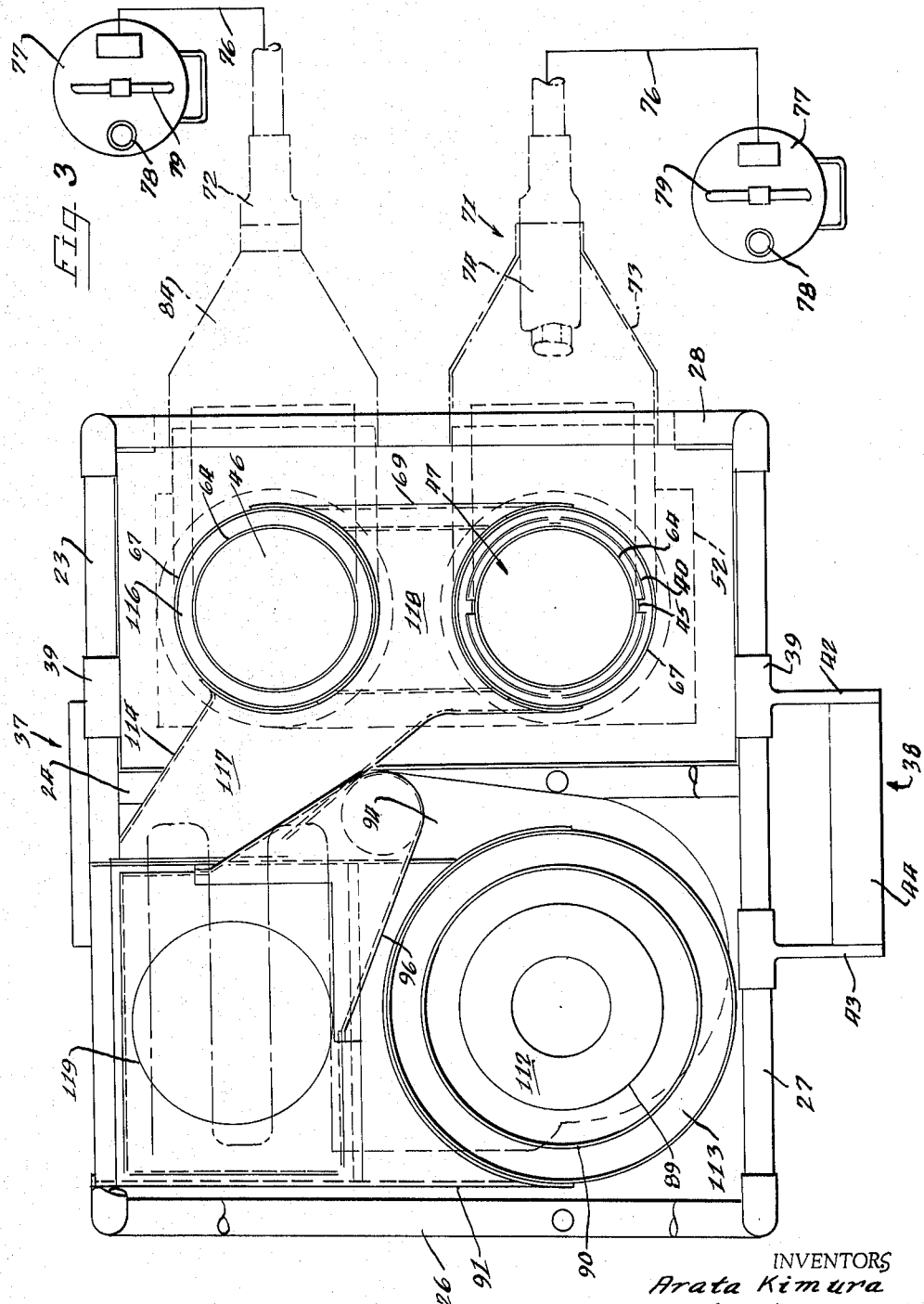

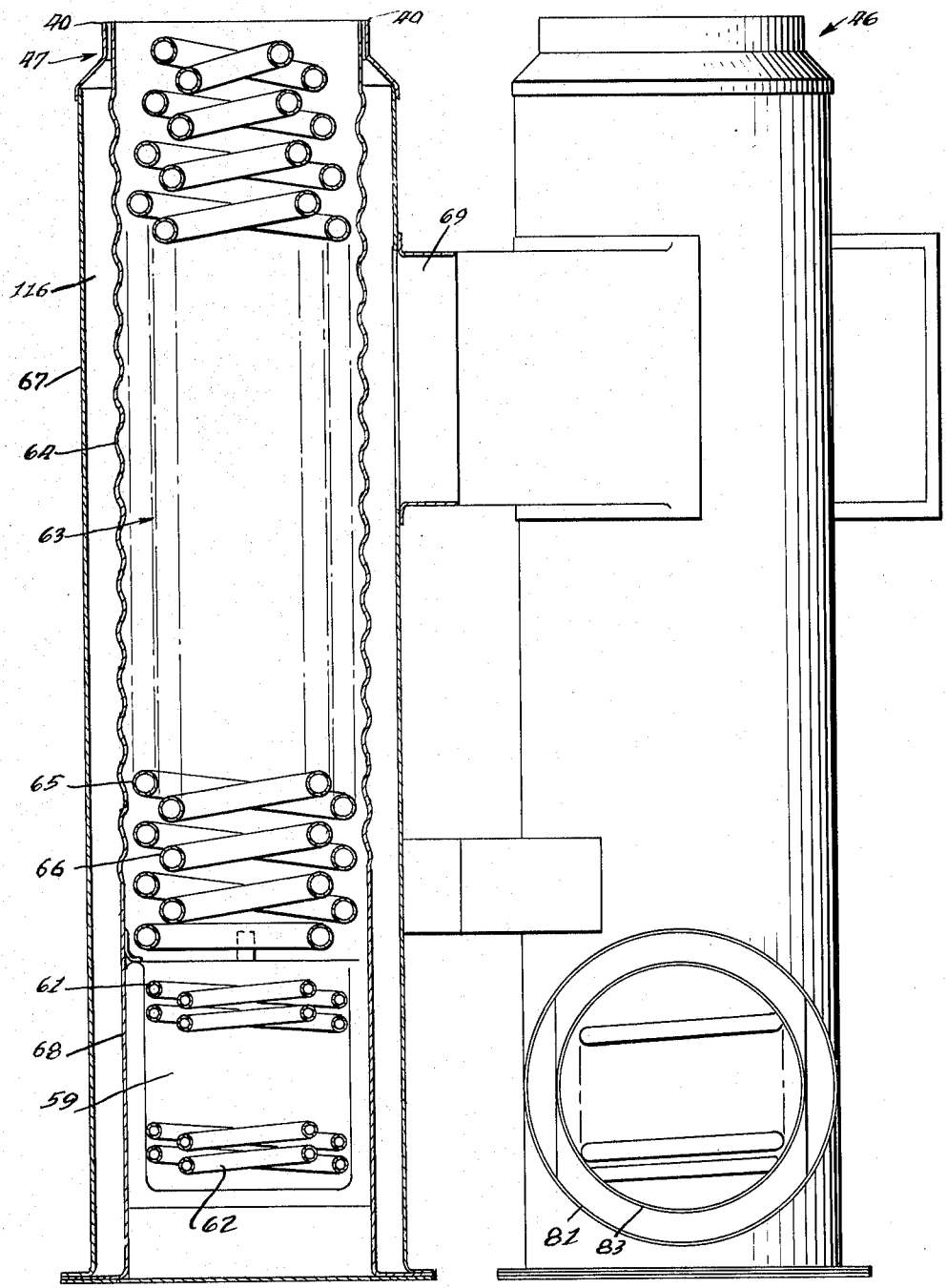

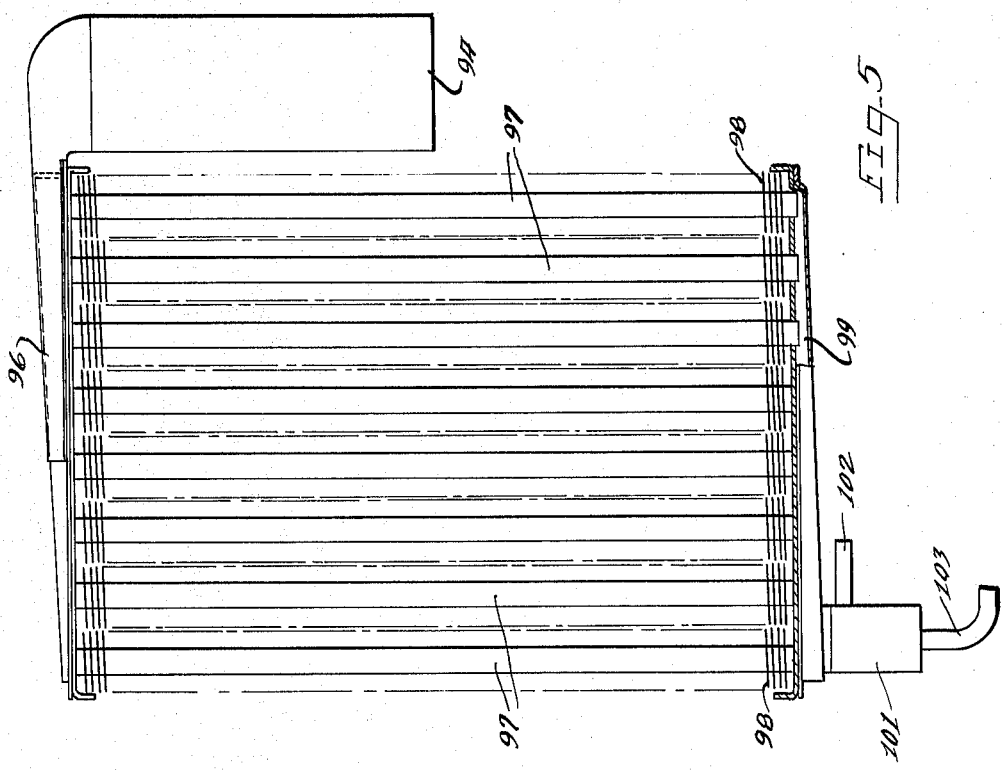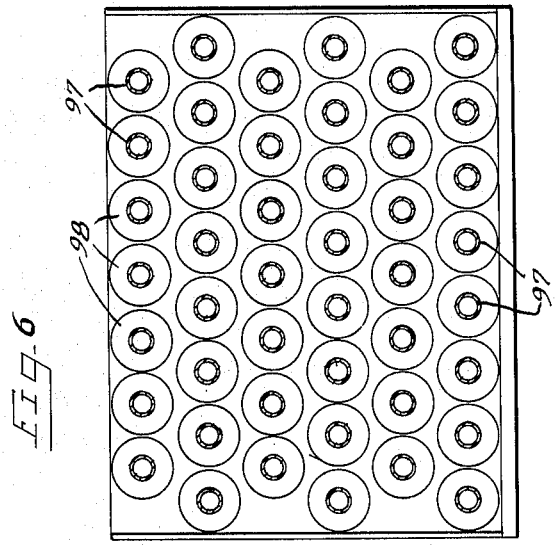

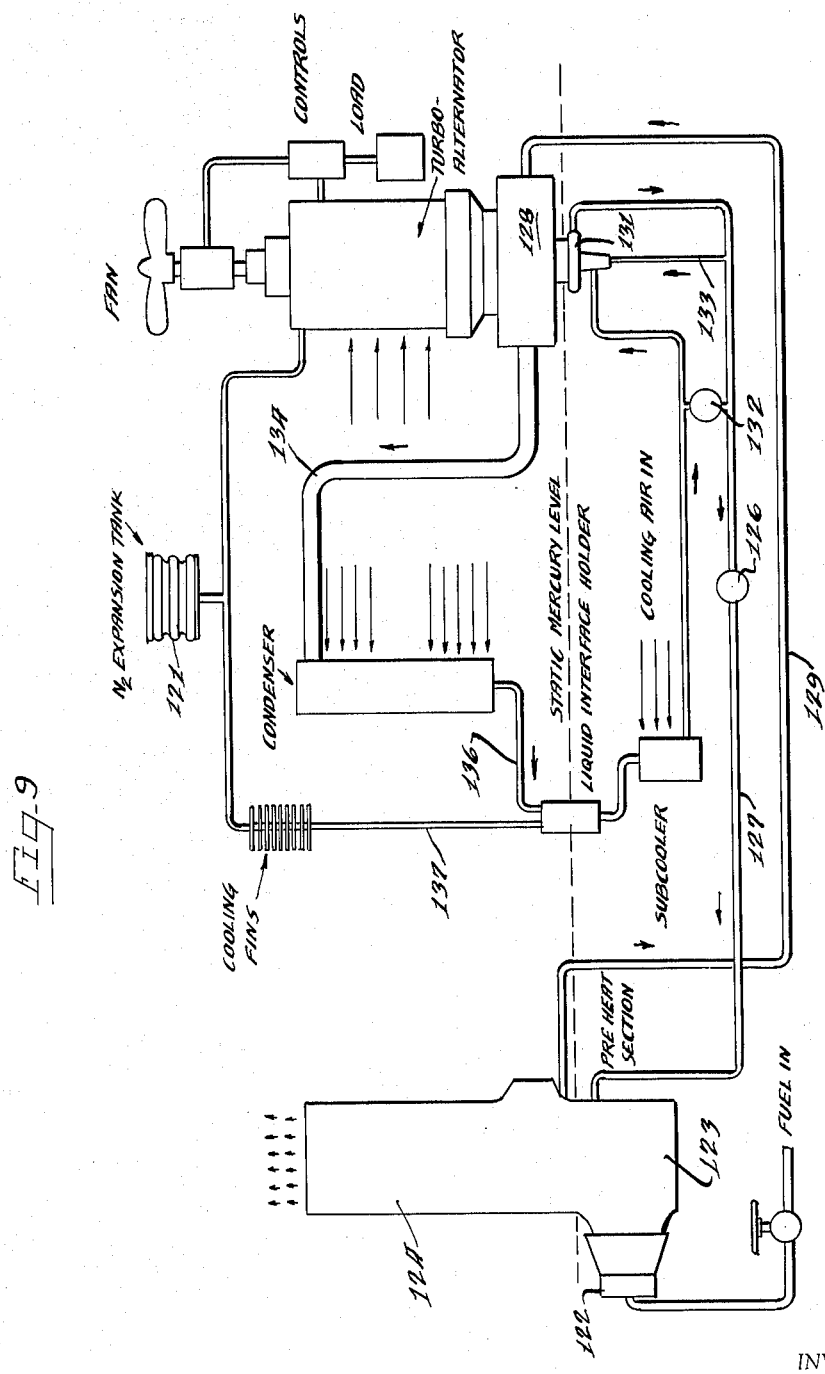

United States Patent Office 3,242,345
Patented Mar. 22, 1966

3,242,345
LIGHTWEIGHT ELECTRICAL GENERATOR SET EMPLOYING A MERCURY POWER CYCLE AND NITROGEN COVER GAS
Arata Kimura and Richard P. Nemetz, both of Chagrin Falls, Ohio, assignors to TRW Inc.
Filed Nov. 9, 1961, Ser. No. 151,332
7 Claims. (Cl. 290—2)

The present invention relates to an electrical power conversion unit, and more particularly to an electrical power conversion unit that is lightweight and is manually portable.

Power conversion units are used as power plants for generating electrical energy. Difficulties encountered in transportable power plants are the inability of the power plants to produce sufficient electrical energy and operate constantly over a prolonged period of time. The manual power plant wherein the alternator is driven manually, lacks the ability to operate continuously because the operator becomes physically exhausted. The power plants utilizing a turbine energy to drive an alternator closed cycle boiler system are too heavy to be carried and could not operate under all types of conditions. Portable power plants are needed to generate electrical energy to operate communicating systems from remote areas back to a home base. The unit has to be manually portable in order to be carried by its operators as they move from place to place and over rough terrain.

The portable power plants of the prior art were insufficient in their ability to produce enough electrical energy to generate the communicating system, were uneconomical to produce and operate and were unable to operate in all types of climates. The known power plants also were not silent operating and this is detrimental in using the power plant where silence is of the utmost necessity.

A detriment that appeared in transportable power units that operated on a closed mercury system was the leakage of the mercury which occurred when the system was moved and shaken or bumped. The prior art failed to adequately seal the portable power plant against leakage of the mercury especially between the alternator and the proximately located driving turbine, as well as failed in producing a unit that could operate for a long period of time and not overheat.

It is an object of this invention to provide an electrical generating unit that is manually portable.

It is a further object of this invention to provide an electrical generating unit that is operated by the burning of leaded gas and other common hydrocarbon fuels.

It is further an object of this invention to provide a portable power plant that is inaudible at 100 feet to normal human hearing in low ambient noise level and is capable of operating in ambient temperature environments from −65° to +125° F. and altitudes up to 8000 feet.

It is a further object of this invention to provide a portable power plant that is hermetically sealed.

It is further an object of this invention to provide a portable power plant that may be separated into two units, a complete power plant unit and a burner unit.

It is further an object of this invention to provide a portable power plant that is capable of generating electric energy and has a nitrogen cover gas system.

It is further an object of this invention to provide a portable power plant unit that is capable of generating electric energy and includes a liquid interface holder and subcooler.

It is further an object of this invention to provide a manually portable power plant unit capable of generating electric energy that contains a system for cooling the burner.

It is further an object of this invention to provide a manually portable power plant with a compact boiler unit having twin boilers.

It is further an object of this invention to provide a manually portable power plant with a compact boiler unit which contains a primary boiler section and a preheating boiler section.

On the drawings:

FIGURE 1 shows an isometric view of the assembled lightweight power plant;

FIGURE 2 shows a cutaway of the power plant giving a side view of the alternator and one of the boiler units;

FIGURE 3 is a top view of the power plant shown in FIGURE 1;

FIGURE 4 is a side view of the twin boiler units used in the power plant with a cutaway of one of the boiler units;

FIGURE 5 is a side view of the condenser unit used in the power plant;

FIGURE 6 is a top view of the condenser shown in FIGURE 5;

FIGURE 7 is the cutaway side view of the liquid interface cooler shown in FIGURE 5;

FIGURE 8 is a top view of the interface holder condenser plate shown in FIGURE 7; and FIGURE 9 is a diagrammatic illustration of the operation of the portable power plant.

As shown on the drawings:

The invention advantageously exploits the utilization of an inductor alternator which is simple in construction, has a minimum number of parts, does not use rotating windings and rectifiers, and does not use brushes and slip rings, but utilizes the mechanical strength of the electromagetic iron to construct a simple and rugged rotor. The alternator also needs no initial D.C. field power for alternator startup. Such an alternator which is both reliable with minimum weight and maximum efficiency is the modified Lundell alternator.

The power plant is separable into two packages. One package of the compact lightweight electrical generating power plant utilizes tubular supports to minimize its weight. The said one package contains two interconnected compact boiler units having a primary boiler and preheater section that vaporize a mercury liquid. Liquid mercury is fed into the preheaters and through the primary boiler sections. These sections are composed of helically wound coils for presenting the maximum heat transfer and area. The boiler units vaporize the mercury and the mercury is fed into a turbine mounted adjacent said boiler units which converts the thermal energy of the mercury vapor into mechanical energy. The turbine drives a Lundell alternator which converts the mechanical energy into electrical energy. The alternator utilizes part of the electrical energy to rotate a fan also mounted on said one package which circulates air throughout the system for use as a coolant and oxygen supply for boiler burners. From the turbine the mercury vapor is fed into a condenser mounted in said one package which is cooled by the air. From the condenser the mercury vapor passes to a liquid vapor interface holder and therefrom to a subcooler from which the liquid is recycled through the boiler units. The complete unit in the one package, except for the burners which are the second package, is maintained during closedown under a nitrogen cover gas. During operation of the power plant the nitrogen gas rises into a nitrogen expansion tank which also collects the non-condensible materials and prevents inefficient operation of the boiler unit.

The operators of the compact, electrical generator unit carry the unit by handles which are connected to the tubular frames. There are usually two operators, one in each side of the unit. They carry the unit in one hand and carry the burner in their other hand. The burner is a common gasoline type of burner which weighs about 25 pounds including the gasoline storage tank.

The tubular package is set in position and levelized by adjusting levelizing legs. The burners are then connected onto the boiler units. The burners are ignited and the unit is set for operational use with a transmitter or other electrical equipment.

Referring to FIGURES 1, 2 and 3, there is shown the power plant with a first tubular supported package of of the compact generator set 11. The first package has tubular side frames 12, 13, 14 and 16; bottom tubular frame members 17, 18, 19, 21 and 22 and top support tubular rail members 23, 24, 26, 27 and 28, and an intermediate support rail 29 connected to the rails 24 and 22. The tubular sections are united at their respective support points by welding, or any other type of suitable permanent bonding. The uniting of the tubular elements may also be made by triple joints as indicated in FIGURES 2 and 3.

The bottom support members have attached thereto legs 31, 32, 33 and 34. Attached to the legs 31, 32, 33 and 34 (not shown but diagonal to leg 32) is an adjustable support base 36. The base 36 is threaded into each of the legs 31, 32, 33 and 34 and thereby may be vertically adjusted. The base portion also may be pivotally mounted on a ball bearing portion in each of the legs 31, 32, 33 and 34 to allow the base 36 to sit firm on irregular terrain. The adjustable base 36 allows the electrical generating unit to be levelized in any type of terrain without the necessity of finding auxiliary levelizing means.

The first package of the power plant is carried by handles 37 and 38 connected to the top tubular members 23 and 27. The handles are pivotally mounted on the tubular members 23 and 27 by concentric fittings 39 and 41 which have extending therefrom arms 42 and 43 that mount a carrying handle 44. Thus, the handles may be placed in a downward position when the unit is being used or stored, and in an upward position when the unit is being carried. Other types of handles may be connected to the tubular frame member or the handles could be eliminated and the package carried by the tubular frames. Encompassing the outer portion of the tubular frames, is a fine wire screening (not shown) to prevent the admission of contaminant material such as dirt and debris being blown into the generator package. The electrical generator unit package encloses two boiler units 46 and 47 that are enclosed by a thin sheeting of metal 48 and mounted on one end of the generating package 11. On the opposite end and facing outward is a control panel 49 with control 51 mounted thereon. Within the unit and in back of the control panel is a condenser 52 and a subcooler 53 having externally finned tubes 54 and 56. Adjacent the condenser is mounted a turbine-alternator-fan unit 57. The boiler unit is fed circulating air through ducts generally indicated at 58.

The boiler unit as shown in FIGURES 2, 3 and 4 and more particularly in FIGURES 2 and 3 is a twin boiler system made up of two multi-pass, once through, forced convection, mercury boilers 46 and 47 described hereinafter in regards to the single boiler unit 47 which is identical and has the same components as the boiler unit 46. The boiler unit comprises a preheating section 59 which is composed of helical tubes having an outer helical tube 61 that extends the length of the preheating section 59. The helical tube 61 is continuous with an inner concentric helical tube 62. The preheating section 59 is connected to a primary boiler section 63 which has corrugated walls 64. The walls are corrugated to maintain rigidity with low weight. Within the walls 64 of the primary boiler section 63 are an outer helical tube 65 that extends the length of the primary boiler section, and an inner helical tube 66. The inner tube 66 is continuous with the outer helical tube 65.

The preheated and primary boiler sections are surrounded by an outer wall 67 which is used for circulating air around the preheater and primary boiler sections. The boiler units 46 and 47 are interconnected between respective walls 67 by an air duct unit 69 which allows air to circulate through the two respective boiler units 46 and 47. The units are then encased by sheet metal 48 which in turn may be insulated to prevent the escape of heat.

The boiler unit is used to transfer sufficient heat from a burning chemical fuel to the mercury working fluid of the power conversion system where electrical power is generated. A boiler unit necessitated by a portable generating unit must have high heat transfer and compactness. The above described boiler has these qualities. It has a large ratio of tube length to tube diameter that assures the complete boiling of the mercury and that liquid is not carried over; it has continuous helical coils which assures minimum boiler size and allows for multipass on a through flow of mercury; and within each of the helical coils is a swirl wire insert that increases the heat transfer coefficients.

A high exhaust temperature out of a boiler is a source of heat energy loss. In order to utilize this heat energy, the above ensembled power plant feeds relatively cool air into the boiler unit. The air is circulated around the boiler and is heated by the exhausting heat and thus lowers the exhaust temperature from the boiler. A portion of the heated air is circulated around the preheater section and ducted to burners in a burner section of the power plant. By using heated air at the burner for the burning of the hydrocarbon fuel, a low specific fuel consumption is maintained. A low specific fuel consumption enables the power plant to be operated for long periods of time with a small amount of fuel. Thereby the amount of fuel needed to be carried with the manually portable power plant is reduced to a minimum.

The burners 71 and 72 hereinafter described with respect to burner 71 (both burners being identical) are connected by reflector members 73 to the respective boiler units 46 and 47. The burners have a flame section 74 and a fuel supply line 76 connected to a fuel tank 77. The fuel tank having a pressure gauge 78 and a pressure actuating feed member 79. The fuel burner reflector member 73 is connected with the annulus opening 81 of the preheater section of the boiler unit as is shown in FIGURE 4. The burner may be ignited either by a spark producing means 82 which is connected thereto as is shown in FIGURE 2 or by manual ignition. The flame from the burner heats the preheater coils through the annulus member 83 of the preheater section. The annulus member 83 presents an extending portion of the wall member 68 and the annulus portion 81 is connected to or forms an extending part of the wall member 67 of the respective boiler units 47 and 46, thus forming an annuluar space 84 for the heated circulating air to pass for mixing with the fuel for the burner 71 allowing a low specific fuel consumption.

The boiler heats the liquid mercury which is fed into the preheating outer tubes 61 downward through the preheater and upwards through the inner tubes 62 to the inner tubes 66 of the primary heating zone 63 and downward through the outer helical tubes 65 and to the outlet 86 as a vapor to a turbine 87. The mercury vapor actuates the turbine and the turbine changes the thermal energy into mechanical energy and actuates an alternator 88 located in close proximity to the turbine 87 as shown in FIGURE 2 which alternator converts the mechanical energy into electrical energy. The alternator 88 is a Lundell externally excited alternator which requires no initial D.C. field power for its startup. The alternator is surrounded by a tubular shielding 89 and the tubular shielding 89 as well as the condensing means 52, is surrounded by sheet material 91. An axial flow fan 92 is mounted on top of the alternator shield means 89 to draw air in from the outside atmosphere to cool the alternator 88 and act as the coolant for the condensers 52 and subcooler 53. The fan is driven by electrical power supplied to it from the alternator.

The mercury vapor passing from the turbine passes to the condenser through inlets 94 shown in FIGURE 5. The mercury vapor then passes from the inlet through a manifold 96 into the condensing tubes 97 which are encompassed by external cooling fins 98. The mercury passes through a manifold 99 which feeds the mercury into a liquid vapor interface holder 101. The mercury liquid interface holder has an outlet 102 for non-condensibles and an outlet 103 for the mercury liquid which is fed to a subcooler 53. The mercury liquid-vapor interface holder 101, shown in FIGURES 7 and 8, vents non-condensible gases from the condenser through the pipes 102. This venting of non-condensibles allows the mercury vapor to be condensed more efficiently. Mercury vapor from the condenser is contained in chamber 105 and which is above a refractory plate 107. The refractory plate 107 has apertures 108 whose size are dependent upon the condensing pressures within the mercury liquid interface holder 101. The refractory plate 107 condenses the mercury vapor so that mercury liquid is passed into the chamber 109 and into the outlet pipe 103 which leads to the subcooler 53. The subcooler has external fins 106 that are similar to the fins 98 used in the condenser 52. The liquid mercury leaves the subcooler and passes to the mercury pump 111 which feeds the mercury by a pipe 152 through a valve 153 to the inlet pipe 84 of the boiler preheater. The feed 84 and the outlet 86 for the boiler units are Y-type feed line. This type of feed line feeds the mercury to both boilers and allows the mercury to be exited from and fed to both boilers by a single line.

Turbine 87, alternator 88 and a mercury pump 111 are integrally mounted on a common shaft so that the energy supplied to the turbine 87 by the incoming mercury vapor drives the alternator, the turbine and the pump.

The first power package 11 contains all units for the power package including the duct air cooling work, the condenser, the alternator, the mercury pump, the turbine, the air intake fan, the subcooler, the liquid interface holder, the boiler unit and the control panel.

Referring to FIGURES 2 and 3 the fan 92 in the package 11 brings in cooling air from the atmosphere that is used to circulate through the package to cool the condensers and subcooler as well as the boiler units and the alternator. The fan brings the air in and passes the air around the alternator through the space 112 formed by the alternator 88 and the wall 89 and 90. Air is also passed through and around the condenser coils for the condenser 52 through the space 113. The space 113 surrounds the wall 89 and 90 and the condenser to direct the air perpendicularly inbetween the condenser tubes 97 and over the fins 98. An illustration of the tubes 97 and the fins 98 is shown in FIGURES 5 and 6. The air passes from the condenser to duct 114 defining a space 117 contacting the boiler unit and directly through the duct 69 which connects the two helical tube boilers and their respective outer walls 67. The air is circulated around the primary boiler sections between the outer wall 67 and the wall 64 and around the preheating sections into the annular space 84 and fed to the burners 74.

The line passing from the liquid interface holder for non-condensibles and a line extending from the upper housing of the alternator are connected to a nitrogen expansion tank 121. The nitrogen expansion tank 121 is a bellows-metal nesting or a bellows-rubber impregnated nylon with wire reinforcement. The nitrogen expansion tank is used to store nitrogen cover gas, maintain a pressure on the mercury side of the system which is equal to atmospheric pressure during storage and operation, collect non-condensible gases from the liquid mercury interface holder, and maintain a nitrogen cover within the alternator cavity by venting the cavity to the nitrogen expansion tank to prevent vaporous mercury from entering the cavity via the adjoining turbine unit and damaging the alternator windings. The nitrogen cover gas fills that part of the system that is not occupied by liquid mercury during the storage or while the generating unit is not operating. Liquid mercury is present in the boiler preheat section, the subcooler, and the mercury pump, all of which are indicated by FIGURE 9 as being below the static mercury line level.

The nitrogen expansion tank when compressed prevents leakage of air into the generating unit while it is in storage; a backup of the mercury into the portions of the system that do not want liquid mercury therein such as the alternator and the turbine unit, which backup might otherwise accidentally occur for instance, when the generating unit is shaken or upset during transportation thus forcing mercury into the turbine and adjoining alternator unit; and also provides a seal against mercury vapor in the alternator by filling up the alternator cavity. During operation of the power plant, the nitrogen tank which is compressed by a snap strap or similar means, is released and allowed to expand. The non-condensibles from the liquid vapor interface holder are directed thereto. The alternator cavity is vented to the expansion tank during operation thereby keeping a vaporous mercury from entering the alternator windings.

Referring to FIGURE 9, the nitrogen expansion tank is released and expanded, a burner 122 is ignited; the mercury contained within a preheater 123 is heated, and mercury vapor begins to flow through a primary boiler 124 as the burner 122 heats the mercury. A check valve 126 located at a boiler inlet line 127 prevents back flow into a subcooler. As the expanding mercury vapor builds up pressure, the mercury vapor begins to flow into a turbine 128 by a feed line 129. The turbine operates an alternator and a mercury pump 131 so that once operating speed is reached the mercury pump will overcome the check valve and flow to the boiler will begin. The mercury vapor is passed from the boiler to the turbine 128 and then through a line 134 to a condenser where it is cooled, from the condenser through a condenser outlet 136 (corresponding to manifold 99 in FIGURE 7) to a liquid interface holder. The liquid interface holder vents to the nitrogen expansion tank and allows non-condensible gases to be vented to the nitrogen expansion tank through a line 137 (corresponding to pipe 102 in FIGURE 7). The non-condensibles are cooled prior to reaching the expansion tank so as to not unduly heat the gases within the expansion tank. Mercury vapor which is not condensed in the condenser is condensed in the liquid interface holder and the mercury then passes into the subcooler. From the subcooler liquid mercury is directed to the pump or directly through a valve 132 into the boiler feed line 127 for drainage of the system after system shutdown. The mercury pump 131 has a bypass line 133 to prime the mercury pump.

The alternator supplies electrical current to the control which operates the fan so as to intake cooling air in around the turbo alternator unit. The fan brings in cooling air at the outside temperatures, −65° to 125° F., wherever the unit is being operated from. The air is used to cool the condenser. The air exits from the condenser and is vented through ducts through the boiler unit 124. Most of the air is used to cool the exhausting heat of the boiler. The remaining air from the condenser is circulated around the annulus surrounding the boiler where it is preheated. The preheated air then is supplied to the burner. By utilizing preheated air in the burner the specific fuel consumption is cut very low. Low specific fuel consumption is very important because it allows the use of relatively small quantities of fuel over a long period of time. Small quantities of fuel allows the carrying of small light fuel tanks and thus facilitates maneuverability of the manually portable power plant. A parasitic load is used on the alternator to regulate any excess of electricity produced by the alternator.

It will be understood that modifications and variations of the foregoing preferred exemplary embodiment of the invention may be effected without departing from the spirit and scope of the invention as defined by the following claims.

We claim as our invention:

1. A manually portable power plant assembly comprising: a lightweight tubular support, supporting a boiler unit which is used to vaporize an operating fluid, a turbine receiving the vaporized fluid from the boiler unit, an alternator operatively connected to the turbine driven by the vapor from the boiler, a condenser condensing the vapor exited from the turbine and feeding the condensed fluid to said boiler to form a closed cycle of operating fluid, and duct means directing cooling air from said condensing unit to said boiler unit to lower the exhaust temperature from said boiler unit, with a portion of said cooling air being directed by said duct means and utilized as preheated air at said boiler unit.

2. A portable electrical power conversion unit comprising: a carrier enclosing said conversion unit, said carrier mounting boiler unit including condenser means, a turbine connected to an outlet of said boiler unit, said turbine operatively connected to an alternator which converts mechanical energy into electrical energy, said turbine having an exit portion connected to the condenser portion of the boiler unit to form a closed cycle operating condition, said condenser unit and said alternator having connected therebetween a nitrogen expansion tank providing the power conversion unit with a cover gas, and said boiler unit having means to detachably connect a burner thereto.

3. A portable generating unit comprising: a frame having mounted thereon a boiler assembly, a condenser assembly operatively connected to said boiler assembly, a turbine in operative connection with said condenser and boiler assembly, an alternator drivenly connected to said turbine, a fan supplying cooling air to said condenser and boiler assembly and connected to said alternator, means for circulating a portion of said air about said boiler assembly to preheat said portion of air, said boiler assembly having two boilers connected by a common inlet line and a common outlet line, each boiler having a preheat section as connected to the boiler inlet line, means mounted on each preheater section to detachably mount a burner means, means to feed said preheated air to said burner means, each boiler unit containing continuous inner end outer helical coils completely vaporizing an operating fluid before exiting said fluid from said boiler.

4. A manually portable power plant assembly comprising: a frame having mounted thereon a boiler assembly having two boiler units, each boiler unit having a primary boiler section and a preheat section, each boiler having a common inlet and a common outlet for mercury, said inlet connected to said preheat section, said outlet connected to said primary boiler section, said preheat section having means to detachably mount a burner means, said inlet connected to helical coils in said preheat section and said outlet connected to helical coils in said primary boiler section; a turbine mounted adjacent to said boiler assembly on said frame, said turbine having an inlet and an outlet, said inlet of said turbine operatively connected to said outlet of said boiler assembly; an alternator mounted on said frame, said alternator drivenly connected to said turbine and converting mechanical energy supplied by the turbine into electrical energy; a fan mounted in said frame operatively connected to said alternator providing the power plant with cooling air; means for circulating a portion of said air about said primary boiler section so as to preheat said portion of air, means for feeding said preheated air to said burner means, a condenser assembly mounted on said frame having primary condenser, a mercury vapor inlet, said mercury vapor inlet connected to said turbine outlet, a mercury vapor and mercury liquid outlet on said primary condenser; a liquid vapor interface holder mounted in said frame connected to said primary condenser; a subcooler mounted in said frame having an inlet and an outlet, the inlet of said subcooler connected to the outlet of said interface holder, and said subcooler outlet connected to the preheat section of the boiler assembly.

5. A manually portable power plant assembly comprising: a boiler unit, a turbine operatively connected to said boiler unit, an alternator drivenly connected to said turbine, a condenser assembly having a liquid interface holder between a primary condenser and a subcooler, means operatively connecting said condenser assembly with said turbine and said boiler, means connecting said liquid interface holder and said alternator with a nitrogen expansion tank.

6. A portable generating unit comprising: a frame having mounted thereon a boiler assembly, a turbine connected to said boiler assembly and mounted adjacent thereto on said frame, an alternator drivenly connected to said turbine and mounted on said frame, a condensing unit mounted adjacent said turbine, said condensing unit being interconnected between said turbine and said boiler assemblage, a nitrogen expansion tank connected to said alternator and said condensing unit within said frame, and said nitrogen expansion tank providing nitrogen cover gas for an alternator cavity, and nitrogen expansion gas providing nitrogen pressure balancing gas for said condenser unit.

7. A method of portably generating electricity comprising: passing mercury liquid through a helical path, vaporizing said mercury liquid completely, operatively contacting a turbine with said mercury vapor, converting mechanical energy produced by said turbine into electrical energy, forcing non-condensible gases from a condenser by mercury vapor exited from said turbine, storing said non-consensible gases forced out of said condenser for later use in said condenser when said condenser is not in operation, condensing said mercury vapor, and recirculating said mercury vapor to be revaporized.

References Cited by the Examiner
UNITED STATES PATENTS

| | | | |
|---|---|---|---|
| 1,015,777 | 1/1912 | Bradley | 60—36 |
| 1,659,930 | 2/1928 | Trumble. | |
| 2,507,293 | 5/1950 | Arant | 122—250 |
| 2,536,949 | 1/1951 | Livingood | 122—250 |
| 2,568,787 | 9/1951 | Bosch. | |
| 2,671,859 | 3/1954 | Wallene | 290—2 X |
| 2,823,652 | 2/1958 | Mader | 122—250 |
| 2,835,230 | 5/1958 | Cleaver et al. | 122—149 X |
| 2,904,014 | 9/1959 | Meyers | 122—250 X |
| 2,961,549 | 11/1960 | Shipalto | 290—1.1 |
| 2,961,550 | 11/1960 | Dittman | 290—2 |
| 2,977,937 | 4/1961 | Deitlhauser | 122—240 |
| 3,007,306 | 11/1961 | Martin et al. | |
| 3,055,643 | 9/1962 | Beurtheret | 165—110 |
| 3,061,733 | 10/1962 | Humpal | 290—2 |
| 3,063,682 | 11/1962 | Greene et al. | 165—110 |

ORIS L. RADER, *Primary Examiner.*

MILTON O. HIRSHFIELD, *Examiner.*